H. N. EASTMAN.
GAS MIXER FOR INTERNAL COMBUSTION ENGINES.
APPLICATION FILED JULY 3, 1919.
1,384,184.
Patented July 12, 1921.
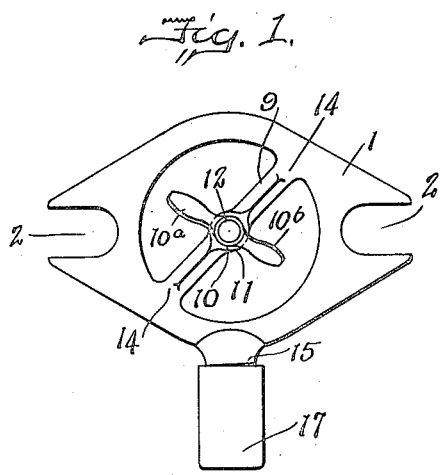
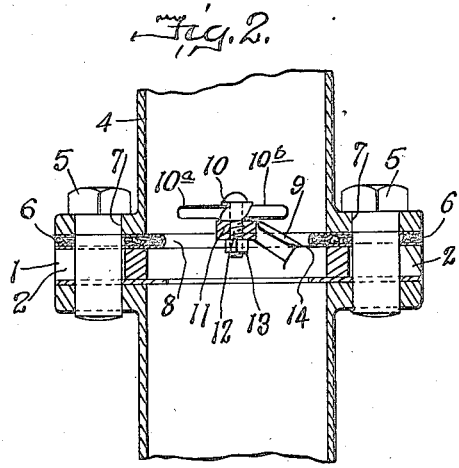
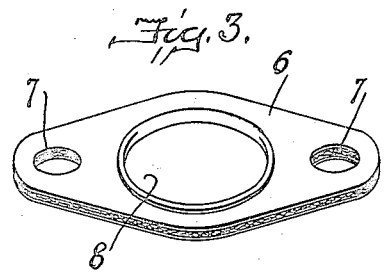
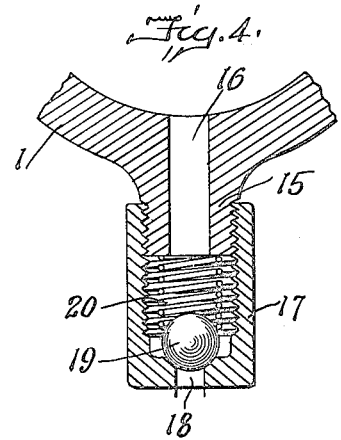
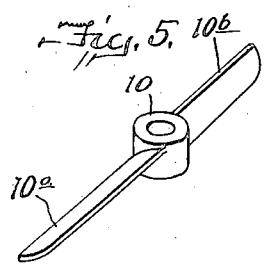
Inventor
Harry N. Eastman,
Toulmin & Toulmin,
Attorneys

UNITED STATES PATENT OFFICE.

HARRY N. EASTMAN, OF DAYTON, OHIO, ASSIGNOR OF ONE-THIRD TO THOMAS F. McDONALD AND ONE-THIRD TO ARTHUR A. McDONALD, BOTH OF DAYTON, OHIO, AND ONE-THIRD TO CARRIE J. EASTMAN, OF PORTSMOUTH, OHIO.

GAS-MIXER FOR INTERNAL-COMBUSTION ENGINES.

1,384,184.        Specification of Letters Patent.      Patented July 12, 1921.

Application filed July 3, 1919. Serial No. 308,565.

*To all whom it may concern:*

Be it known that I, HARRY N. EASTMAN, a citizen of the United States, residing at Dayton, in the county of Montgomery and State of Ohio, have invented certain new and useful Improvements in Gas-Mixers for Internal-Combustion Engines, of which the following is a specification, reference being had therein to the accompanying drawing.

This invention relates to gas mixers for internal combustion engines and has for its particular object to provide an improved auxiliary gas vaporizer adapted to be used in connection with any of the well known gas mixers or carbureters now generally used on engines of this character.

An object of the invention is to provide an auxiliary vaporizer which as used in connection with a carbureter will act to more completely effect carburation or vaporization of the gaseous fuel after the same has been acted upon in the usual manner in the carbureter and before the vapor is delivered to the cylinders of the motor.

As is well known in connection with the use of gaseous fuels in the operation of internal combustion engines, the fundamental requirement of carburation is to effect the proper proportion of fuel and air to all motor speeds under varying temperatures and climatic conditions.

Proper vaporization of the gaseous fuel is of greater importance, where the best results in carburation are to be obtained, than the proper mixture of air with the fuel. Many troubles which are supposed to be due to improper mixture, are in reality due to condensation of the fuel in the manifold of the engine, thus resulting in unequal distribution thereof to the cylinders of the engine. Where this condition obtains the fuel flows sluggishly along the walls of the fuel passages and does not respond promptly to the throttle control.

Under these conditions of imperfect vaporization the exhaust of the engine smokes excessively and becomes foul smelling, thus indicating that the exhaust contains drops of fuel, or fuel only partially consumed. Such fuel is burned in the open atmosphere and represents fuel waste and consequent loss of power.

With my improved auxiliary mixer the gaseous fuel, as above stated, is further acted upon after the same has passed through the carbureter to effect more complete mixture thereof. Thus the fuel as it is delivered to the motor is in a high state of volatilization, a complete breaking up of the fuel having been effected and every particle thereof rendered responsive to combustion so that the highest power efficiency is obtained therefrom without waste.

A further object of the present invention is to prevent condensation of the gaseous fuel charges as the same are delivered into and through the engine manifold. To this end my improved mixer is provided with means, responsive to the fuel pressure and the suction of the engine thereon, whereby a vortex is created in the fuel passage to the engine manifold and the fuel is precipitated into a rapid whirling motion which has the effect of causing more complete mixture and also to prevent condensation of the fuel upon the walls of the fuel passages.

In the accompanying drawings:

Figure 1 is an elevation of my improved mixer of the side toward the engine manifold;

Fig. 2 is a detail view in cross section of the mixer and showing the mixer attached;

Fig. 3 is a detail view of an improved gasket adapted to be used in connection with the mixer to make a suitable joint between the carbureter and the engine manifold and to effect adjustment of the mixer relative to the volume of fuel delivered therethrough;

Fig. 4 is a detail view in cross section of the air valve; and

Fig. 5 is an enlarged detail view of the propeller shown in the assembly Figs. 1 and 2.

As here shown the mixer consists of an integral oblong base plate or frame 1 having open bearing slots 2 in the opposite ends thereof whereby the device may be adjustably secured in the joint between the fuel passage leading from the carbureter 3 to the engine manifold 4, suitable bolts 5 being used to hold the joint securely together. To make the joint gas tight a gasket plate 6 having bolt holes 7 and a fuel aperture 8 therein is employed which serves the further purpose of regulating the volume of fuel admitted through the mixer into the charge box of the engine; the gaskets being made interchangeable and the apertures 8 in different sizes to adapt the mixer and fuel supply to the capacity of the engine.

A bridge 9, made integrally with the base plate 1, extends diametrically across the apertures 8 and supports substantially at its central portion a propeller 10 which is rotatively mounted on the apex of the bridge, the bridge having an enlarged portion 11 at its central portion to provide a suitable bearing support for the propeller. The propeller is mounted on the bridge to rotate freely thereon on a bearing post 12 which extends through the hub portion 11 and is secured thereto by a lock nut 13.

The bridge 9 may be of any suitable shape in cross section, but as here shown is preferably diamond shaped, see Fig. 2, whereby to prevent condensation of fuel vapor thereon, the angular faces of the bridge tending to shed therefrom any condensate into the fuel passages.

To accommodate gasket plates of different sizes so that the same may lie flush with the face of the base plate 1, the bridge is provided at its opposite ends with a straight section 14. Thus the gasket plate has limited adjustment relative to the bridge and plates having different size apertures 8 therein may be readily applied on the mixer.

The propeller 10 is substantially of the design used in airplane construction and as distinguished from an ordinary fan propeller has decided advantages for the purposes of the present invention. Aeroplane propellers are designed to cut the air with the least resistance, the cutting edges of the opposite blades being set off-center or in advance of the center line of their axis, and the angle of the blades is determined from the view point of minimizing air friction or resistance. Thus in the present use the propeller fan responds more readily to the suction of the engine and the fuel pressure theron and rotates with a freer and faster movement.

With the rapid rotation of the propeller a vortex is created in the aperture 8 and the space surrounding the bridge 9. The gaseous fuel drawn up from the carbureter is thus set in a rapid whirling motion which acts to effect a more thorough mixture thereof before the charge passes through the manifold into the cylinders of the engine. This rapid movement of the fuel also tends to prevent condensation thereof, thus acting generally to effect complete combustion and maximum development of power.

As here shown, an auxiliary air valve may be combined with the mixer whereby with the increasing speed of the engine, additional air will be drawn into the vaporizer for the purpose of effecting a thinner mixture, the operation being entirely automatic and responsive to the speed of the engine.

The auxiliary air valve consists of an integral extension 15 of the plate 1, having an air passage 16 extending therethrough and forming the outlet port of the valve. The extension 15 is threaded to receive a cap 17 which has an aperture 18 extending through the end thereof to form the inlet port of the valve. A ball 19 and spring 20 are assembled within the cap 17 in such a manner that the spring acts normally to press the ball against the inlet port 18, thus closing the port to the passage of air. As soon as the suction of the engine is sufficient to overcome the pressure of the spring, the spring will yield and the port 18 will open, thus admitting additional air to the mixture flowing into the engine.

As here shown the air valve is located at right angles to the center line of the plate 1 extending through the slots 2, the bridge 9 extending across the aperture 8 at an angle of substantially 45° to the bridge. This angular relation of the parts aids materially in the free movement of the air and fuel against and over the sides of the bridge and minimizes the tendency of the vapor to condense and adhere to the exposed surfaces adjacent the fuel passages.

The arch of the bridge in addition to supporting the propeller in a plane above the base plate 1 in which it has entire freedom of movement, also serves to provide clearance for operation of the butter-fly valve (not shown) which is usually employed between the carbureter and the engine manifold. As here shown the lower surface of the arch rises substantially above the upper surface of the base plate 1, thus providing for free movement of the gaseous charge on opposite sides of the bridge through the aperture 8, the movement being greatly facilitated by the action of the propeller.

In starting the engine it has been found in practice that the propeller will start more readily if one of the blades is made substantially longer than the other blade, thus causing unequal pressure to be exerted thereon which will cause the propeller to start revolving more freely than is the case when the propeller blades are of equal length. This difference of construction in the propeller blades is best shown in Fig. 5, the blade $10^a$ being shown substantially longer than the blade $10^b$.

It is obvious, of course, that changes may be made in the details of arrangement here shown without departing from the principles of my invention. Such structural changes without substantial departure from the functions of the invention are contemplated in the appended claims.

Having thus fully described my inven- tion, what I claim as new and desire to secure by Letters Patent, is:—

1. In combination, with the intake manifold of an internal combustion engine, an auxiliary fuel mixer supported in said manifold consisting of an apertured frame arranged transversely in said manifold and having a bridge diamond shaped in cross section and inclined to an apex and integral with the diaphragm and spanning said aperture, and a propeller mounted on said bridge and having the cutting edges of its blades in advance of the center line of their axis.

2. In combination, with the intake manifold of an internal combustion engine, an auxiliary fuel mixer supported in said manifold consisting of an apertured diaphragm a bridge diamond shaped in cross section and inclined to an apex and integral with the diaphragm, and blades one longer than the other rotatably mounted on the apex of said bridge.

3. In combination, with the intake manifold of an internal combustion engine, an auxiliary fuel mixer supported in said manifold consisting of an apertured diaphragm arranged in said manifold and having a bridge integral therewith spanning the aperture, said bridge having oppositely inclined supports, diamond-shaped in cross section and blades rotatably supported on the apex of said bridge and a gasket having an aperture smaller than the aperture in the diaphragm.

4. In combination, with the intake manifold of an internal combustion engine, an auxiliary fuel mixer supported in said manifold, consisting of an apertured diaphragm, a bridge across the aperture, rotatable blades mounted on the bridge, a gasket having an aperture smaller than the aperture in the diaphragm, and a valved extension integral with the diaphragm.

In testimony whereof, I affix my signature.

HARRY N. EASTMAN.